United States Patent [19]

Himmelstein

[11] Patent Number: 4,542,643
[45] Date of Patent: Sep. 24, 1985

[54] FLUID LEAK TESTING METHOD

[75] Inventor: Sydney Himmelstein, Barrington Hills, Ill.

[73] Assignee: S. Himmelstein and Company, Hoffman Estates, Ill.

[21] Appl. No.: 555,204

[22] Filed: Nov. 25, 1983

[51] Int. Cl.$^4$ ............................................. G01M 3/26
[52] U.S. Cl. ................................................... 73/49.2
[58] Field of Search ....................... 73/49.2, 49.3, 40.7

[56] References Cited

U.S. PATENT DOCUMENTS

| | | | |
|---|---|---|---|
| 2,749,743 | 6/1956 | Foster | 73/49.3 |
| 2,872,806 | 2/1959 | Mamzic | 73/49.2 |
| 2,880,610 | 4/1959 | McCoy | 73/49.2 |
| 3,738,158 | 6/1973 | Farrell et al. | 73/49.3 |
| 3,762,212 | 10/1973 | Morley et al. | 73/40.7 |
| 3,855,844 | 12/1974 | Craig | 73/40.7 |
| 3,888,111 | 6/1975 | Craig | 73/40.7 |
| 3,987,664 | 10/1976 | Hass et al. | 73/49.2 |
| 4,126,034 | 11/1978 | Conrad | 73/49.2 |

FOREIGN PATENT DOCUMENTS

| | | | |
|---|---|---|---|
| 2429432 | 1/1975 | Fed. Rep. of Germany | 73/49.2 |
| 750303 | 7/1980 | U.S.S.R. | 73/49.2 |

OTHER PUBLICATIONS

S. Himmelstein and Company, Bulletin 965, (1979).

Primary Examiner—Peter Hruskoci
Attorney, Agent, or Firm—Wood, Dalton, Phillips, Mason & Rowe

[57] ABSTRACT

A method for testing leakage from an element, such as a container. The element to be tested is sealed within an enclosure so as to define a reduced volume space in the enclosure around the container. An increase in the pressure in the surrounding space is detected as a function of the amount of leakage of high pressure fluid from the container to that space. Reduced temperature sensitivity is effected by reducing the pressure in the space. However, the device functions to improve sensitivity where the space is provided at ambient pressure at the start of the test cycle, as well. The apparatus may include a control for effecting the leakage testing automatically and indicating to the user the result of the testing as desired.

4 Claims, 4 Drawing Figures

FLUID LEAK TESTING METHOD

BACKGROUND OF THE INVENTION

1. Field of the Invention

This invention relates to fluid leak testing and in particular to a tester and testing method of determining leakage of pressurized fluid from a container.

2. Description of the Background Art

A common method of determining fluid leakage characteristics of a container is to measure pressure decay following pressurizing of the container with a suitable fluid. It is conventional to utilize air as the pressurizing fluid in many of the testing procedures, as air has the desirable characteristics of being nontoxic, nonflammable, noncorroding and noncontaminating in most instances. By measuring the pressure decay, a quantitative as well as a qualitative indication of the leakage characteristics is obtained. Apparatuses have been developed for automatically measuring such pressure decay with high accuracy and sensitivity.

In one common pressure decay method, the container is pressurized with air from a pressurized air source controlled by an isolation valve. The pressure within the container is monitored during the pressurization step and following the closing of the isolation valve when the desired pressure within the container is reached.

It is conventional in such pressure decay testing to stabilize the pressure by allowing the container to remain with the preselected pressurized fluid therein for a preselected period of time following which the testing of the pressure decay is initiated.

After a second preselected period of time, comprising a test time interval, the pressure within the container is again measured to determine any decrease therein resulting from leakage. One excellent example of a pressure decay leak tester utilizing the above method is that identified as the Himmelstein Model 6500 Pressure Decay Leak Tester, manufactured by the assignee hereof and described in Himmelstein Bulletin 965.

Such testers have an inherent limitation in sensitivity controlled by the sensitivity of the components. The pressure transducer must have sufficient range to accurately measure the operating test pressure. Further, the minimum leak that can be detected by the pressure transducer is determined by the resolution and repeatability of the pressure transducer detector.

The sensitivity of the apparatus is further inversely proportional to the volume of the test item. Thus, an increase in the test volume provides a corresponding decrease in the net pressure change due to a leak.

SUMMARY OF THE INVENTION

The present invention comprehends an improved fluid leak testing method eliminating the disadvantages of the prior art structures in a novel and simple manner.

The method of the present invention is extremely simple and economical while yet providing improved sensitivity and facility.

The method of the invention provides improved sensitivity which may be independent of the test item pressure and volume.

The invention further comprehends the provision of such a method providing reduced temperature sensitivity for improved accuracy and facility.

More specifically, the invention comprehends the provision of an improved fluid leak tester including enclosure means defining a hermetically sealable space for sealingly enclosing a container to be leak-tested having fluid therein under a pressure greater than the initial pressure in the space, and means for determining a pressure increase in the space exteriorly of the item therein as an incident of leakage of fluid from the container into the space.

The initial pressure may be preselected and, illustratively, comprises, in the preferred embodiment, a below-ambient pressure providing substantial immunity to temperature variations in the testing procedure.

Where the initial pressure is ambient pressure, reduced temperature sensitivity is provided by the tester of the present invention.

In the illustrated embodiment, the enclosure has a slightly larger configuration than the configuration of the container whereby the free volume of the surrounding space has a preselected small value.

The pressure within the container may selectively be maintained during the testing, or may be allowed to decay, as desired.

The invention further comprehends the provision of a novel method of determining fluid leakage from a pressurized container, including the steps of determining the fluid pressure within the container at a start time, providing an enclosure having a predetermined pressure less than that of the fluid in the container, causing any leakage of fluid from the container after the start time to be received in the enclosure so as to cause an increase in the fluid pressure therein, and determining the increase in the fluid pressure in the enclosure at a test time subsequent to the start time.

More specifically, the invention comprehends such a novel method including the steps of increasing the fluid pressure within the container to a preselected value, providing an enclosure, decreasing the pressure within the enclosure to a predetermined value less than that of the fluid in the container, storing the predetermined value of the pressure in the enclosure at a start time when both the pressure in the container has reached the preselected value and the pressure in the enclosure has reached the predetermined value, causing any leakage of fluid from the container after the start time to be received in the enclosure so as to cause an increase in the fluid pressure therein, determining the final pressure in the enclosure at a test time subsequent to the start time, and comparing the final pressure in the enclosure with the predetermined pressure to determine the increase in pressure therein resulting from such leakage as an indication of any such leakage.

By providing a vacuum condition in the surrounding space at the start time, the test may be made to be substantially independent of temperature changes for providing substantially increased accuracy and facilitated measurement.

By measuring the pressure differential in the surrounding space, the pressure transducer is not subjected to the pressure within the container and, thus, may have a very low full scale range providing substantially increased accuracy over such detectors measuring the pressure changes in the container itself.

BRIEF DESCRIPTION OF THE DRAWING

Other features and advantages of the invention will be apparent from the following description taken in connection with the accompanying drawing wherein.

DESCRIPTION OF THE PREFERRED EMBODIMENTS

Figure 1:
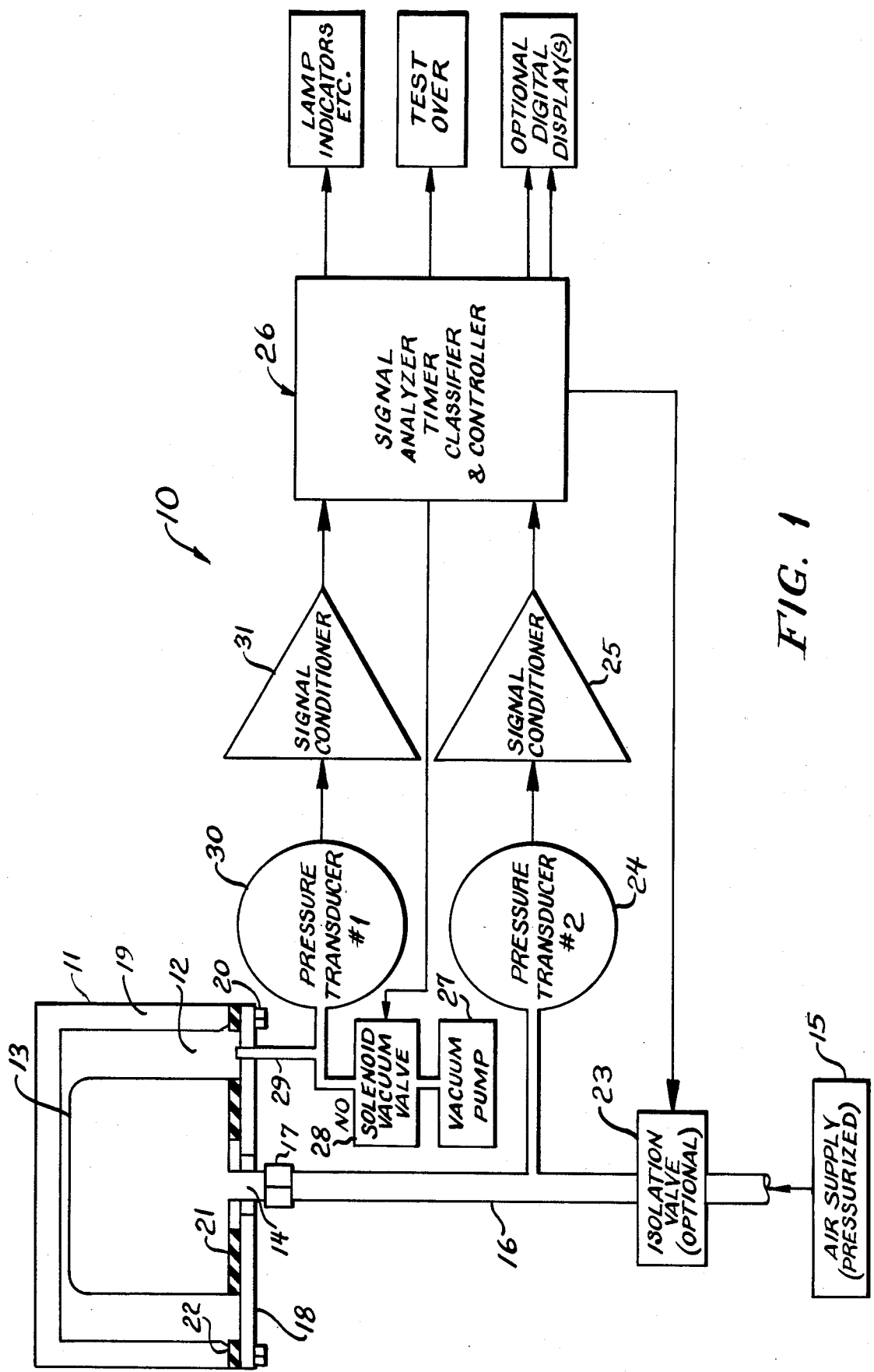
FIG. 1 is a schematic block diagram illustrating the apparatus and method of the preferred embodiment of the invention.

In the illustrative embodiment of the invention as disclosed in the drawing, a fluid tester generally designated 10 is shown to include an enclosure 11 defining a hermetically sealable space 12 for sealingly enclosing a container 13 to be leak tested.

As shown in FIG. 1, the container may be provided with an inlet portion 14 adapted to be connected to a pressurized air supply 15 through a conduit 16 and a connector 17.

As shown in FIG. 1, the container 13 may be sealingly mounted to a fixture baseplate 18 secured to the enclosure sidewalls 19 by suitable means, such as screws 20. The container may be removably sealed to the baseplate by a gasket 21 and the baseplate may be sealed to the sidewalls 19 by a gasket 22, as shown. Thus, the container 13 may be provided with an internal fluid pressure from supply 15 within a sealed surrounding space 12 in the housing 11.

An isolation valve 23 may be optionally provided so as to disconnect the container 13 from the pressurized fluid supply 15 after the pressure in container 13 is brought to a preselected value. Any leakage from the container in space 12 will correspondingly reduce the pressure within container 13. Alternatively, where the isolation valve is not provided or allowed to remain open during the testing operation, the air pressure in container 13 will be maintained at the pressure of the supply 15 during the test.

When the pressure in container 13 reaches the preselected pressure, a pressure transducer 24 provides an indication thereof through a signal conditioner, which illustratively may comprise a conventional strain gage amplifier 25, to a control generally designated 26.

As indicated briefly above, in the preferred embodiment, it is desirable to provide a vacuum condition in space 12. For this purpose, a conventional vacuum pump 27 is connected through a normally open solenoid vacuum valve 28 and conduit 29 to space 12 through closure plate 18. Control 26 is connected to the vacuum valve 28 so as to close the valve when the desired low pressure is reached in space 12 as determined by a pressure transducer 30 connected to conduit 29 and providing a signal through a signal conditioner 31 illustratively comprising a conventional strain gage amplifier, to the control 26.

Figure 3:
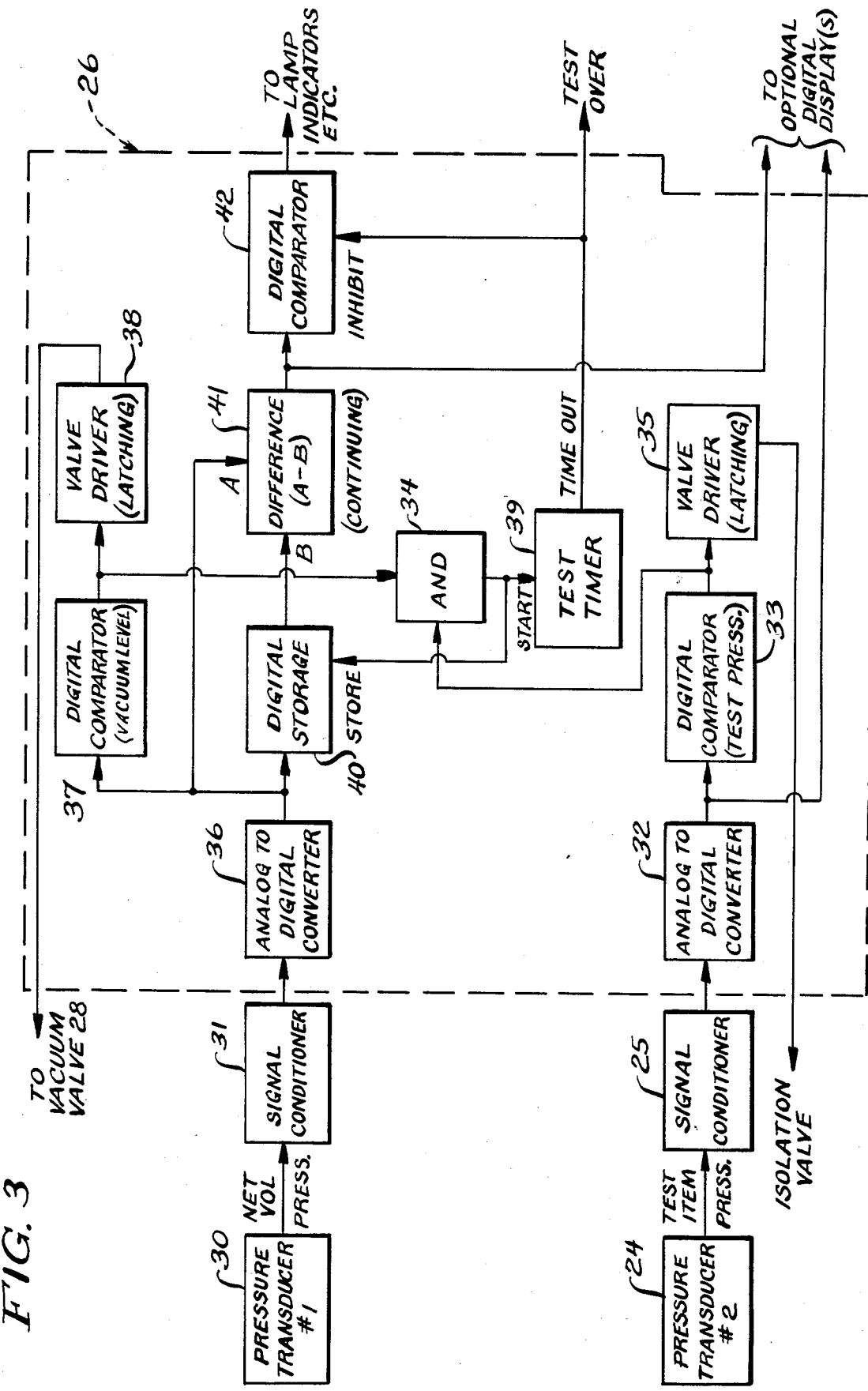
FIG. 3 is a fragmentary schematic diagram illustrating in greater detail the apparatus of FIG. 1.

Referring now to FIG. 3, a general layout of the control 26 is illustrated in greater detail. More specifically, the signal from signal conditioner 25 is delivered to a conventional analog to digital converter 32. As shown, the digital value of the pressure sensed by transducer 24 may be delivered to an optional digital display, as desired.

Further, the digital signal from converter 32 is delivered to a digital comparator 33, which determines when the pressure within container 13 reaches the preselected desired pressure so as to provide, at that time, a signal to an AND gate 34. Where the isolation valve 23 is utilized, the output of the digital comparator 33 further provides a signal to a latching valve driver 35 for closing the isolation valve.

Concurrently with the pressurization of the container 13, evacuation of space 12 may be effected by the vacuum pump 27. The vacuum pressure, as indicated above, is sensed by transducer 30 and the instantaneous pressure in space 12 so detected is delivered through the signal conditioner 31 to an analog to digital converter 36 within control 26. One output of the converter 36 goes to a digital comparator 37 which, in turn, controls a latching valve driver 38 so as to close the solenoid vacuum valve 28 when the desired low pressure condition in space 12 is reached. Digital comparator 37 further delivers a signal to the AND gate 34, as shown in FIG. 3.

The testing operation may be made automatic by means of a test timer 39, which receives a start signal from the AND gate when both of the inputs, i.e. the input from comparator 33 and input from comparator 37 indicate the desired pressure condition being reached in container 13 and space 12.

At the same time operation of timer 39 is initiated, AND gate 34 also provides a signal to a conventional digital storage device 40 connected to the output of converter 36, which provides an output signal to a conventional signal difference detector 41. An output signal from converter 36 is also provided directly to the difference detector 41, which functions to compare the stored signal B from storage device 40 with the continuing signal received through pressure transducer 30 during the test period controlled by timer 39. Illustratively, the test operation may be initiated at a start time by the timer 39 and allowed to continue for a preselected period ending at a test time at which time the difference between the stored signal B and the continuing signal A provided to the difference detector 41 is determined by a digital comparator 42 and locked in therein by a signal from the timer 39 indicating the end of the timer period. Concurrently, the test timer 39 may provide a "test over" signal, such as to an indicator or the like. The output of the digital comparator 42 indicating the final difference between pressure B and pressure A may be provided to a suitable indicator, reject lamp, etc., as desired.

As further shown in FIG. 3, the continuing difference detected by detector 41 may be provided through an output signal therefrom to an optional digital display, as desired.

The process and operation of tester 10 is extremely simple. The container 13 to be leak-tested is installed within the housing 11 which, as shown in FIG. 1, has an internal configuration slightly larger than the external configuration of the container 13 so as to define a relatively small volume surrounding space 12. The fixture plate 18 is secured to the housing sidewalls so as to sealingly enclose the container in the space 12.

The interior of the container is then pressurized to a desired pressure condition which may have any suitable value as desired. Concurrently, a vacuum condition is provided in space 12. When the elevated pressure condition in container 13 and the vacuum condition in space 12 reach preselected values, control 26 automatically initiates a testing cycle commencing with a start time and running to a final test time, as determined by the setting of the test timer. During such test cycle, any leakage from the container 13 causes a pressure increase in the evacuated surrounding space 12. The control continuously compares the original vacuum pressure determined at the start time with the pressure condition in the space 12 subsequent thereto. This increase may be provided to a digital display for continuing observation by the operator, if desired.

When timer 39 times out the preselected period, a signal is provided to the digital comparator 42 and final pressure difference detected by detector 41 is locked in for indicating to the user a measured leakage of fluid from container 13 during the test period.

As the pressure in space 12 varies only as a result of any leakage from container 13, the magnitude of the pressure differential may be relatively small so that pressure transducer 30 may comprise a conventional transducer having normal sensitivity, thereby avoiding the need for transducers having exceptionally high sensitivity as required in the conventional testing apparatuses. Illustratively, where the container 13 has an internal volume of 200 cubic inches and is to be tested at a pressure of 300 psi gage, a leakage rate, such as of 1 cc per minute, may be detected during a test period of approximately 2 seconds. Such a leakage would produce an internal pressure drop in the container of approximately 0.0001495 psi. Even a high sensitivity leak detector, such as one having a threshold sensitivity of 0.02 psi, would be inadequate to detect such a pressure drop. However, utilizing the present tester 10 and providing an enclosure having a total volume of 205 inches, the space 12 will have a volume of 5 cubic inches when the container is installed therein, as seen in FIG. 1. The same leakage of 1 cc per minute produces a pressure change in space 12 of 0.00598 psi, which may be readily detected with a conventional gage transducer, such as the Himmelstein 550G-50 50" water column (or 1.8 psi gage) transducer. Such a transducer, when used with conventional high sensitivity leak tester hardware, may have a resolution of 0.0001 psi, which is more than adequate to detect the 1 cc per minute leakage.

The sensitivity of pressure transducer 30 may be increased as desired within the parameters of cost. By providing a vacuum condition in space 12, temperature variations are effectively eliminated, thereby permitting such high sensitivity determinations. Where the space 12 is not evacuated, temperature changes have a substantial effect on the pressure conditions in the space 12 so as to impose a maximum limit on the sensitivity in the absence of such vacuum provision. Thus, the tester 10 eliminates the need for temperature control processes, such as to compensate for adiabatic heating of the container 13 while it is being pressurized, to compensate for variation of ambient room temperature conditions, etc.

Figure 2:
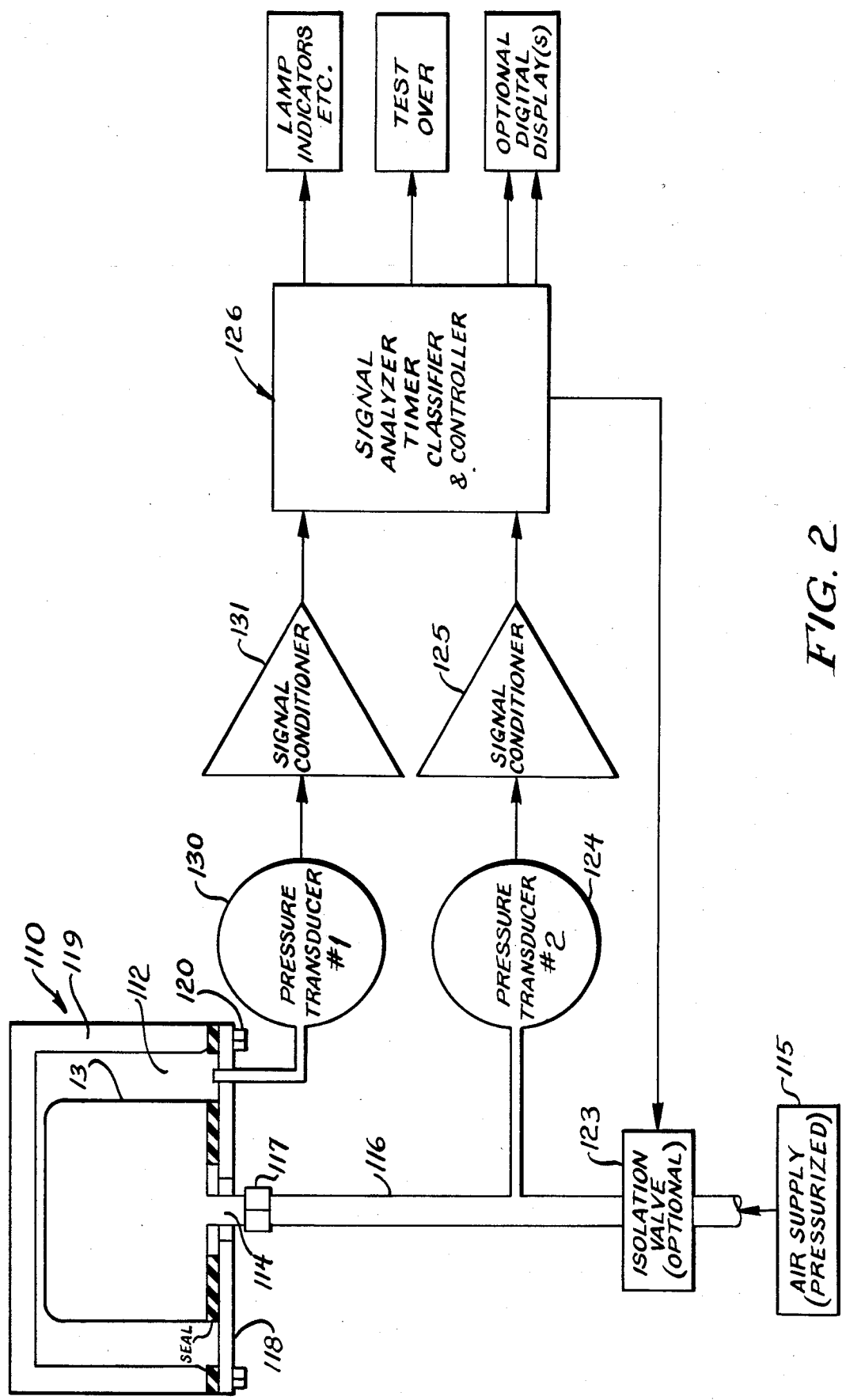
FIG. 2 is a schematic block diagram illustrating a modified form of apparatus and method embodying the invention wherein the surrounding pressure space may be at ambient pressure.
Figure 4:
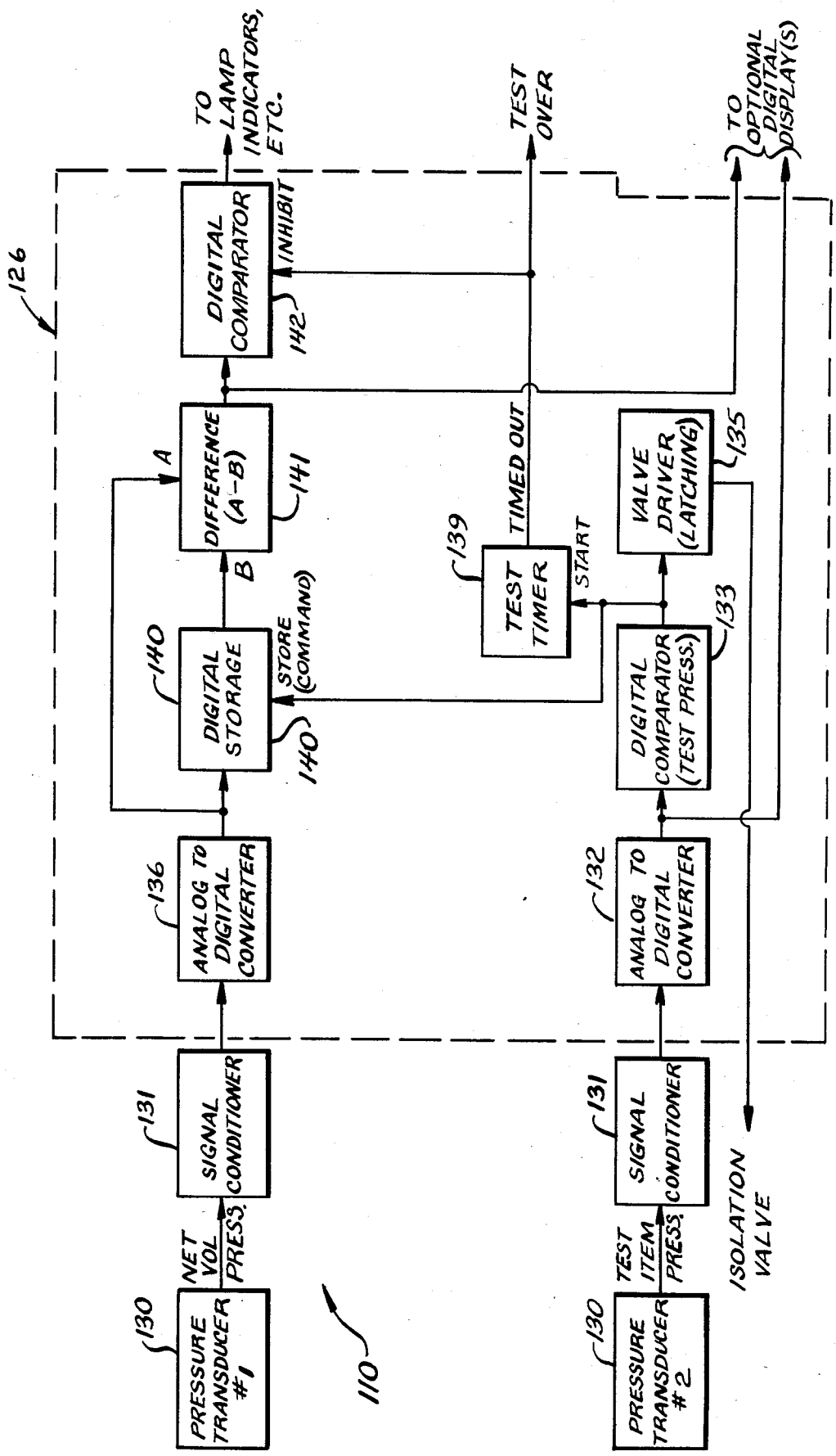
FIG. 4 is a fragmentary schematic diagram illustrating in greater detail the apparatus of FIG. 2.

Referring to the embodiment of FIGS. 2 and 4, a leak tester generally designated 110 is shown to comprise a tester generally similar to tester 10, but wherein the enclosure space 112 is permitted to be at ambient pressure at the test start time. Thus, tester 110 eliminates the vacuum pump 27 and vacuum valve 28 of tester 10. Further, the AND gate 34 of control 26 is eliminated in control 126 of tester 110. Thus, as shown, when the digital comparator 133 provides an output signal indicating that the pressure condition within container 13 is the desired pressure, the initiation of the timing operation of timer 139 is effected without awaiting any vacuum condition signal. The comparator 133 concurrently, with the initiation of the timing cycle, provides a signal to the digital storage device 140 telling it to lock in the sensed pressure in space 112 at that time to serve as the basis for the difference determination in the difference device 141.

Thus, tester 110 may be utilized wherein the testing conditions are suitable to dispense with the vacuum producing means of tester 10. In all other respects, tester 110 functions similarly to tester 10 and all elements of tester 110 corresponding to similar elements of tester 10 are identified by the same reference numerals but 100 higher.

The vacuum provided in tester 10 may be a relatively soft vacuum while yet providing a substantial elimination of undesirable pressure changes due to temperature changes in the apparatus. Illustratively, where the vacuum condition is one of 0.193 psia (or 10 TORR), the reduction in temperature sensitivity is approximately 1600 times as compared to the prior art testers utilizing a 300 psig pressure in the container in detecting the pressure drop from 300 psig resulting from leakage therefrom. While the reduction in temperature sensitivity over the prior art devices is less dramatic with respect to tester 110 utilizing ambient pressure in the space 12, it is still over 75 times compared to the prior art devices.

Thus, each of the testers 10 and 110 provides for improved facilitated and high accuracy leakage testing. The apparatus is extremely simple and economical of construction, while yet providing for facilitated rapid accurate leakage testing of devices, such as containers and the like. While the invention has been described with respect to the item being tested comprising a container, as will be obvious to those skilled in the art, any device arranged to contain a fluid under pressure may be leak-tested with the improved apparatus and method of the invention. The conformation of the enclosure to the external container of the item being tested may be made quite close where a large number of similar items are to be tested. Thus, a range in the improvement of sensitivity is obtained by suitably controlling the conformation of configurations, and a range of reduction in temperature sensitivity may be obtained by suitably controlling the reduced pressure condition in the housing space within the broad concept of the invention.

The foregoing disclosure of specific embodiments is illustrative of the broad inventive concepts comprehended by the invention.

I claim:

1. A method of determining fluid leakage from a pressurized container, said method comprising:
increasing the fluid pressure within the container to a preselected elevated value;
providing an enclosure;
decreasing the pressure within the enclosure to a predetermined vacuum value less than ambient sufficient to substantially eliminate undesirable pressure changes due to temperature changes in said enclosure;
storing the value of the vacuum pressure in said enclosure at a start time when both the elevated pressure in the container and the vacuum pressure in the enclosure have reached said predetermined values;
causing any leakage of fluid from said container after said start time to be received in the evacuated enclosure so as to cause an increase in the fluid pressure therein;

determining the final pressure in said enclosure at a test time subsequent to said start time; and comparing said final pressure in said enclosure with said stored evacuated pressure therein to determine the increase in pressure therein resulting from such leakage as an indication of any such leakage.

2. The method of determining a fluid pressure leakage of claim 1 wherein said preselected pressure value is maintained following said start time until said test time.

3. The method of determining a fluid pressure leakage of claim 1 wherein said preselected pressure value is permitted to decrease as an incident of any such leakage following said start time until said test time.

4. The method of determining a fluid pressure leakage of claim 1 wherein the pressure in the enclosure is compared continuously with said predetermined pressure value from said start time to said test time.

* * * * *